July 12, 1966          R. A. WILSON          3,259,989

METHOD AND APPARATUS FOR AUTOMATIC CENTERING SYSTEM

Filed Dec. 21, 1964          3 Sheets-Sheet 1

INVENTOR

ROBERT A. WILSON

BY James L. O'Brien

ATTORNEY

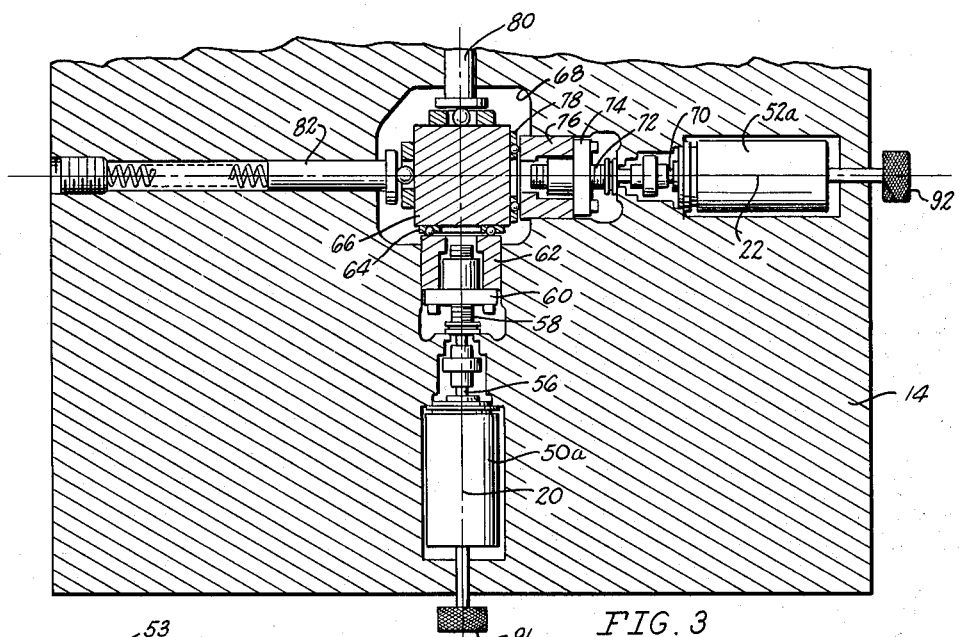
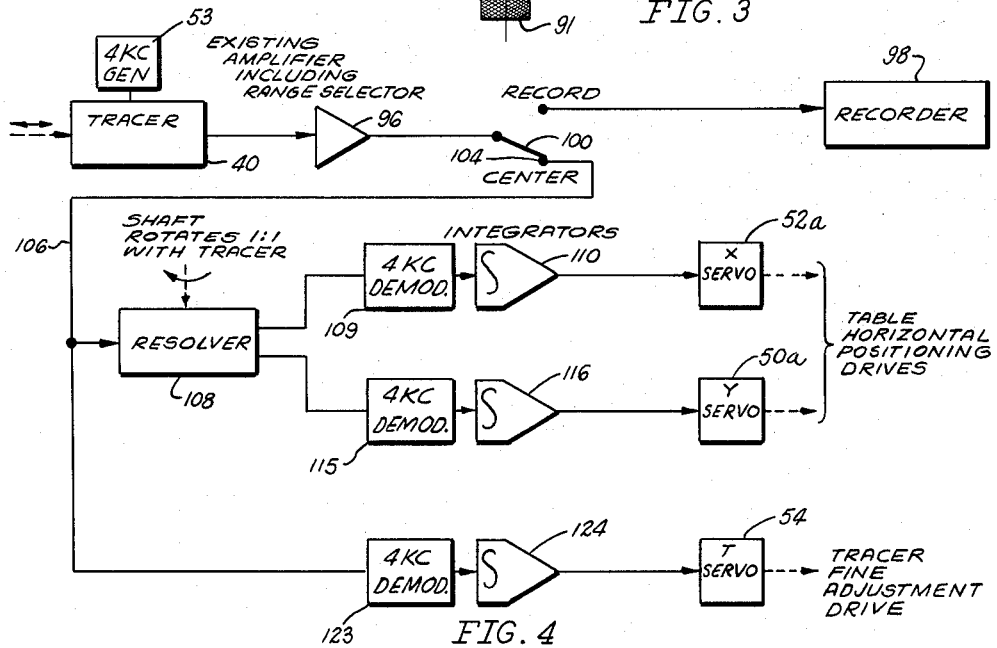

July 12, 1966 R. A. WILSON 3,259,989
METHOD AND APPARATUS FOR AUTOMATIC CENTERING SYSTEM
Filed Dec. 21, 1964 3 Sheets-Sheet 3

INVENTOR
Robert A. Wilson
BY
ATTORNEY

United States Patent Office 3,259,989
Patented July 12, 1966

3,259,989
METHOD AND APPARATUS FOR AUTOMATIC
CENTERING SYSTEM
Robert A. Wilson, Berkley, Mich., assignor to The Bendix Corporation, Ann Arbor, Mich., a corporation of Delaware
Filed Dec. 21, 1964, Ser. No. 419,924
20 Claims. (Cl. 33—174)

This invention relates generally to profile recording and more particularly to an improved method and apparatus for automatically centering an object prior to recording the profile of the object.

Electro-mechanical instruments are used for drawing charts showing the magnified profiles of surfaces on manufactured objects or specimens. From such a chart the roundness, flatness, roughness, waviness, and total profile of the surface can be determined, as well as the existence of surface scratches and flaws. A rotary profile recorder is used when determining the surface roughness and departures from roundness of spherical and cylindrical objects. One form of rotary profile recorder has a plate or table onto which the specimen is clamped. A tracer contacts the peripheral surface of the specimen while either the tracer or the specimen is rotated in a very accurate and concentric manner about a rotational axis. The tracer includes a probe or stylus connected to a mechanical-electrical transducer to provide an output signal that is a measure of departures from perfect concentricity of the surface of the specimen with respect to the rotational axis. Gross fluctuations of the signal indicate departures from roundness whereas small-amplitude, short-duration fluctuations indicate surface roughness. The transducer signal is amplified and recorded on a chart of either strip or circular form.

Consistent measuring accuracy requires that the specimen be centered accurately with respect to the rotational axis of the table or the tracer. With rotary profile recorders where a tracer rotates around a stationary specimen, manual centering involves two principal steps. First the table on which the specimen is clamped, is adjusted along two mutually perpendicular axes until the specimen is centered concentrically with the rotational axis of the tracer. Output signals from the tracer displayed on a meter are observed for two points 180° apart on the test specimen and aligned with one axis of table motion. The table is then adjusted on this axis so that the meter readings at the two opposite points are minimized and are equal in amplitude. This procedure is then repeated for a second set of two opposite points on a second axis perpendicular to the first axis and the meter readings are equalized by adjusting the table along the second axis.

The second step in the centering procedure is to adjust the tracer stylus radially with respect to the specimen to minimize meter deflections all the way around the test specimen. Stated differently, the tracer has a null or zero position radially of the rotational axis for a particular indicator such as a recorder. The tracer is adjusted radially so that displacement of the stylus by the specimen about the null position is minimized in amplitude and equalized in polarity for maximum displacement variations.

These two steps are repeated several times, each time using increasingly higher sensitivity until optimum adjustment is achieved for the particular specimen. Thus the overall objective of the centering operation is to minimize in amplitude and equalize in polarity the maximum fluctuations of the output signal from the tracer as it is rotated about the test specimen so that the highest possible sensitivity can be used without the recording going off scale.

The objects of this invention are to provide automatic centering of a specimen with respect to the rotational axis by a method and an apparatus that effectively achieve the aforementioned overall objective; that are readily usable with commercially available rotary profile recorders and components thereof with only minimum modification to reduce cost; that are fast and consistently accurate and do not depend upon the skill of the operator; and that respond directly to tracer output signals of prior rotary profile recorders.

Further objects, features and advantages of this invention will become apparent from a consideration of the following description, the appended claims, and the accompanying drawing in which:

FIGURE 3 is a horizontal sectional view of the table support in the apparatus of this invention showing a pair of servo motors which are actuated in accordance with the present invention to adjust the table cross slides, and looking substantially along the line 3—3 in FIG. 1;

FIGURE 4 is a circuit diagram of a basic closed loop servo control constructed in accordance with one aspect of the present invention to center the specimen after one complete revolution of the tracer;

Figure 1:
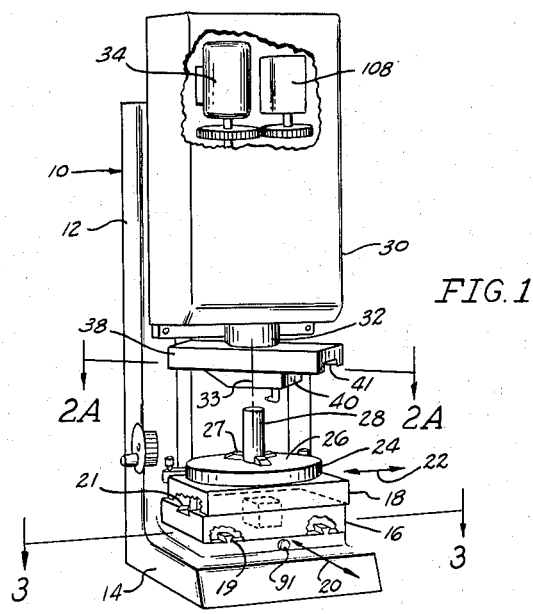
FIGURE 1 is a perspective view of a profile recorder having a table and a rotating tracer that are adjusted automatically in accordance with the present invention to center an object on the table with respect to the rotational axis of the tracer, with some parts broken away to show table cross slides which enable adjustment of the object along mutually perpendicular axes.

With reference to the drawing, a rotary profile recorder incorporating the automatic centering apparatus of this invention, indicated generally at 10, is illustrated in FIG. 1 as including a vertical column 12 supported by an integral flat horizontal base 14. Base 14 also supports a pair of cross slides 16, 18 that permit rectilinear adjustment in two mutually perpendicular directions. Slide 16 is movable on V-guides such as shown at 19 in longitudinal (front-to-back) directions along a Y axis illustrated by an arrow designated by numeral 20 (FIGS. 1 and 3). Slide 18 is movable on V-guides such as shown at 21 in transverse (lateral) directions along a X axis illustrated by an arrow designated by numeral 22 (FIGS. 1 and 3). Fixedly mounted on top of slide 18 is a table 24 which is universally movable in a horizontal plane by means of slides 16 and 18. Table 24 has a flat upper face 26 having a chuck 27 mounted thereon to receive and clamp a specimen 28 whose profile is to be recorded. Disposed above table 24 is a carriage 30 mounted for vertical movement on column 12. A vertical spindle 32 having an axis 33 is journaled in carriage 30 for rotation by a motor 34 connected to the upper end of spindle 32. Fixedly mounted on the lower end of spindle 32 is a horizontal beam 38. A tracer 40 is mounted on beam 38 by a V-guide, such as shown at 41, for adjustable movement radially of spindle 32. Tracer 40 has a probe or stylus 42 which projects downwardly and radially inwardly to contact the outer peripheral surface of workpiece 38 when spindle 32 rotates. As shown schematically in FIG. 2, tracer 40 is formed with a yoke 50 on which stylus 42 is movably mounted. A compression spring 51 is connected between stylus 42 and yoke 50 to yieldably urge stylus 42 radially inwardly. A coil 52 also carried by yoke 50 is connected electrically to a 4 kilocycle generator 53. Coil 52 is disposed relative to stylus 42 so that radial motion of stylus 42 relative to yoke 50 is translated into an electrical signal by modulating current in coil 52. The modulated output signal from tracer 40 (coil 52) is a measure of centering error and concentricity of specimen 28 with respect to the rotational axis 33 of spindle 32 together with a measure of surface imperfections.

The rotary profile recorder described hereinabove is similar to conventional recorders. In such recorders the radial position of the tracer 40 and the horizontal position of slides 16 and 18 along axes corresponding to the Y and X axes 20 and 22 are manually adjusted by means of precision lead screws. In accordance with the present invention, a pair of servo motors 50a and 52a (FIG. 3) are provided for adjusting slides 16 and 18 along the Y and X axes 20 and 22, respectively, to center the specimen 28 with respect to the rotational axis 33 of spindle 32. A servo motor 54 (FIG. 2A) adjusts the radial position of tracer 40 and stylus 42 with respect to specimen 28.

Although particular mechanisms for moving tracer 40 and slides 16 and 18 in response to motors 50, 52 and 54 are not an essential part of the present invention, for purposes of illustration motors 50a and 52a are housed in base 14. Motor 50a is fastened in base 14 and has an output shaft 56 connected to a fine pitch lead screw 58 which extends radially inwardly along the Y axis 20. Screw 58 is threaded in a nut 60 which in turn is fastened on a block 62 slidably mounted in base 14. Block 62 abuts a bearing 64 fastened on one face of a post 66 which is affixed to and depends from slide 18. Base 14 has a central recess 68 that accommodates post 66 for movement therein, and the post also extends through a central aperture (not shown) in slide 16. Similarly, motor 52a is fastened in base 14 and has an output shaft 70 connected to a fine pitch lead screw 72 which extends radially inwardly along the X axis 22. Screw 72 is threaded in a nut 74 which in turn is fastened on a block 76 slidably mounted in base 14. Block 76 abuts the bearing 78 fastened on post 66 at a position 90° to the bearing 64. A pair of spring urged rods 80 and 82 engage post 66 through suitable bearings located diametrically opposite the screws 58 and 72. Rods 80 and 82 maintain blocks 62 and 76 in engagement with bearings 64 and 78 so that rotation of screws 58 and 72 by motors 50a and 52a, respectively, moves post 66, slide 18, table 24 and specimen 28 along the Y and X axis.

Motor 54 is fastened on one end of the beam 38 (FIG. 2A) and is drivingly connected to a fine-pitch lead screw 84 by a gear train 86. Screw 84 has one end journaled in and fixed axially by an end plate 88 on beam 38. Screw 84 extends longitudinally of beam 38 and guide 41 and has its other end threadably engaged by a nut 90 fastened on tracer 40. Nut 90 also serves as a key for movably supporting tracer 40 in guide 41. Rotation of motor 54 in opposite directions moves tracer 40 in opposite directions along guide 41 radially of spindle 32 as viewed in FIG. 1.

As shown in FIG. 3, shafts 56 and 70 of motors 50a and 52a project outwardly of base 14 and are provided with knobs 91 and 92 for manually adjusting screws 58 and 72. Similarly screw 84 on beam 38 projects through end plate 88 and is provided with a knob 93 for manually adjusting screw 84.

Referring to FIG. 4 the modulated output from tracer 40 (coil 52) is coupled as by slip rings (not shown) to an amplifier 96 whose output is in turn connected to a recorder 98 through a switch 100. Amplifier 96 has an adjustable gain to vary the sensitivity of recorder 98. Amplifier 96 is a standard component in a rotary recorder to provide manually variable sensitivity during manual centering operations. Recorder 82 may be a conventional strip or circular chart recorder.

Figure 2A:
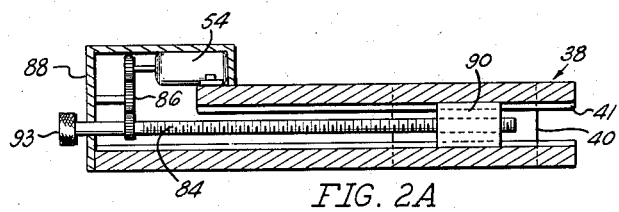
FIGURE 2A is an enlarged sectional view of the tracer adjusting mechanism in the recorder of FIG. 1, looking substantially along the line 2A—2A in FIG. 1.
Figure 2:
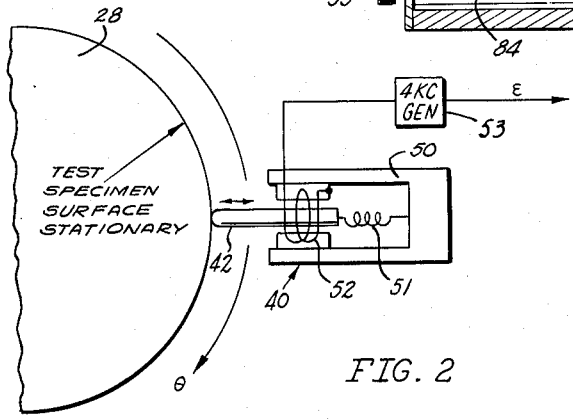
FIGURE 2 is a view schematically illustrating a tracer having a probe engaged by a specimen.

Switch 100 has a contact 104 connected by a lead 106 to a resolver 108 (FIGS. 1 and 4). Resolver 108 is per se conventional and comprises a stator and a rotor. The rotor of resolver 108 is driven by motor 34 as shown schematically in FIG. 1 to rotate syncronously with spindle 32 and tracer 40. The stator of resolver 108 is oriented relative to the Y and X axes 20 and 22 to develop a pair of quadrature control signals resolved along the Y and X axes 20 and 22. Stated differently the output signals from resolver 108 are sine and cosine functions corresponding to X and Y axis components of the tracer output. For example, if the angular position θ of stylus 42 is measured from the Y axis, the X-axis quadrature signal will be a sine function of the tracer output and the Y-axis quadrature signal will be a cosine function of the tracer output. The X-axis quadrature signal is applied through a 4 kilocycle demodulator 109 to an integrator 110 whose output is connected to servo motor 52a (FIGS. 3 and 4). The Y-axis quadrature signal from resolver 108 is applied through a 4 kilocycle demodulator 115 to an integrator 116 whose output is connected to servo motor 50a (FIGS. 3 and 4). The tracer output from amplifier 80 is also connected by terminal 104, lead 106 and a 4 kilocycle demodulator 123 to a third integrator 124 whose output is in turn connected to servo motor 54 (FIGS. 2A and 4).

To initiate a profile recording operation a test specimen 28 is clamped on table 24 and the specimen is roughly centered relative to axis 30 of spindle 32 by manually adjusting knobs 91 and 92. Stylus 42 is then moved into engagement with the periphery of specimen 28 by adjusting knob 93. Switch 100 is moved into engagement with contact 104 and motor 34 is actuated to rotate spindle 32 and thereby move stylus 42 around the periphery of specimen 28. Stylus 42 is displaced radially by specimen 28 to modulate the signal from generator 53. The modulated output from tracer 40 is amplified and applied to resolver 108. Resolver 108 rotates once for each revolution of stylus 42 around the specimen 28 while the stator of the resolver is oriented such that the resolved components of the tracer signal are related to the two mutually perpendicular Y and X axes 20 and 22 of horizontal adjustment available for table 24 by means of guides 19 and 20 and screws 58 and 72. The resolved signals are demodulated and then integrated by integrators 110 and 116 as tracer 40 rotates around the specimen 28 to obtain a measure of centering error in each axis. The outputs from integrators 110 and 116, integrated for one complete revolution around the specimen, are used to reposition table 24 by means of servo motors 52a and 50a to reduce the centering errors to zero. The unresolved output from amplifier 96 is demodulated and then integrated by integrator 124 around the test specimen 28 to provide a measure of tracer adjustment error. The output of integrator 124 is used to reposition the tracer 40 by means of servo motor 50a to reduce the error to zero. The process may be repeated at successively higher sensitivity until the adjustments have been made on the most sensitive scale unstable for the particular test specimen. The servo motors 50a, 52a and 54 are then deactivated and the tracer output signal, now a measure only of the surface characteristics of the specimen 28, is recorded by moving switch 100 to connect amplifier 96 to recorder 98.

The centering action resulting from the above approach is in effect an extension of the four-point method, previously used for manual centering to an infinite number of points about the periphery of the specimen 28. An area cross-section center of specimen 28 at the level contacted by stylus 42 is aligned with the rotational axis 33 of spindle 32.

In accordance with one aspect of this invention, it has been found that the output signal from tracer 40 can be used directly to control motors 50a, 52a and 54. The following considerations in connection with the operation of the servo control illustrated in FIG. 4 form a basis for the embodiment illustrated in FIG. 5. When an operator places a specimen on table 24 or a result of course centering, stylus 42 contacts specimen 28 and the output signal from tracer 40 is within its linear range at all times as tracer 40 rotates around specimen 28. The output signal from coil 52 is a 4 kilocycle carrier, amplitude modulated by a displacement imparted to the stylus 42 by specimen 28 as tracer 40 rotates around specimen 28. The following considerations are in terms of the modulation envelope or its demodulated equivalent.

After coarse centering and prior to completion of fine centering, the tracer output signal can be expressed as follows:
$$E_p = E_t + E_c + E_w + E_r$$
where $E_p$ = total output signal from tracer 40
$E_t$ = the component of $E_p$ due to tracer adjustment error
$E_c$ = the component due to table centering error
$E_w$ = the component due to "low-frequency" departures from roundness, or waviness, of specimen 28
$E_r$ = the component due to "high-frequency" surface roughness of specimen 28.

Each of the above components is a voltage analog of a displacement (in microinches). For a given range of sensitivity all components have the same scale factor (volts per microinch). The scale factor changes when the sensitivity is changed. In Equation 1 the components $E_t$ and $E_c$ are those to be reduced to zero during the centering process, while components $E_w$ and $E_r$ will be recorded after completion of the centering operation.

The component due to tracer adjustment error, $E_t$ is a constant or "direct-current" term as the tracer rotates around specimen 28. All of the other components of $E_p$ are periodic functions of $\theta$, the angular rotation of tracer 40 around specimen 28. They are also functions of time, $t$, where $\theta$ is related to $t$ by the speed of spindle 32, $\omega_{sp}$, in consistent units by
$$\theta = \omega_{sp} t$$

The centering error component, most readily visualized for a perfectly round specimen, will be periodic at a frequency of one cycle per revolution and will be given by
$$E_c = E_c' \sin(\theta + \phi_c) \qquad (3a)$$
or
$$E_c = E_c' \sin(\omega_{sp} t + \phi_c) \qquad (3b)$$
where $\phi_c$ is the angular relation between the peak of the centering error and table axes 20 and 22. When $\phi_c = 0$, there will be a centering correction required only in one table axis; when $\phi_c = 90°$, correction will be required only in the second table axis. For other values of $\phi_c$, correction in both axes will be necessary as will be shown shortly.

The component due to departure from roundness, $E_w$, will also be periodic. For a specimen which is elliptical in shape, $E_w$ will be periodic at two cycles per revolution; for a triangular deformation, 3 cycles per revolution, or in general
$$E_w = E_w' \sin(n\theta + \phi_n) \quad n = 2, 3, \ldots \qquad (4)$$

Specimens which are irregular, with apparent random deformation (which of course repeats once per revolution) can be shown by Fourier analysis to consist of combinations (sums and differences) of terms of the form of Equation 4. Very frequently, however, a single term seems to predominate. Any fundamental frequency terms resulting from irregular specimens will be interpreted by the centering system as centering errors and will be included in the table correction made. A term of this type will occur, for example, if the specimen includes a bump or depression which persists for a relatively large increment of $\theta$. Inclusion of a correction for such an irregularity in the centering adjustments is generally desirable in terms of permitting maximum recording sensitivity.

The component of $E_p$ due to surface roughness, $E_r$, will consist of terms such as in Equation 4, but at higher frequencies. In this case a single frequency is less likely to predominate, and hence $E_r$ is best expressed as
$$E_r = \sum_m E_{rm}' \sin(m\theta + \phi_m) \qquad (5)$$
Equation 1 may then be rewritten as
$$E_p = E_t + E_c \sin(\theta + \phi_c) + E_w \sin(n\theta + \phi_n) + \sum_m E_{rm} \sin(m\theta + \phi_m) \qquad (6)$$
In the analysis immediately following, however, the preceding is simplified to
$$E_p = E_t + E_c \sin(\theta + \phi_c) + E_w \sin 2\theta \qquad (7a)$$
or
$$E_p = E_t + E_c \sin(\omega_{sp} t + \phi_c) + E_w \sin 2\omega_{sp} t \qquad (7b)$$
since all other terms which may be contained in $E_p$ will yield results equivalent to those obtained for the terms included above.

To obtain a measure of table centering error corresponding to each axis in which corrective adjustments can be made, $E_p$ must be resolved into two mutually perpendicular components. With resolver properly oriented this operation yields.
$$E_{px} = E_p \sin\theta \qquad (8)$$
and
$$E_{py} = E_p \cos\theta \qquad (9)$$
Substituting Equation 7a yields
$$E_{px} = E_t \sin\theta + E_c \sin(\theta + \phi_c) \sin\theta + E_w \sin\theta \sin 2\theta = E_t \sin\theta + E_c \sin^2\theta \cos\phi_c + E_c \sin\theta \cos\theta \sin\phi_c + E_w \sin\theta \sin 2\theta \qquad (10)$$
and
$$E_{py} = E_t \cos\theta + E_c \cos\theta \sin\theta \cos\phi_c + E_c \cos^2\theta \sin\phi_c + E_w \cos\theta \sin 2\theta \qquad (11)$$
Integrating $E_{px}$ completely around the specimen yields the total error:

$$\epsilon_x = \int_0^{2\pi} E_{px} d\theta$$
$$= E_t \int_0^{2\pi} \sin\theta \, d\theta + E_c \cos\phi_c \int_0^{2\pi} \sin^2\theta \, d\theta$$
$$+ E_c \sin\phi_c \int_0^{2\pi} \sin\theta \cos\theta \, d\theta$$
$$+ E_w \int_0^{2\pi} \sin\theta \sin 2\theta \, d\theta$$
$$= \left[ -E_t \cos\theta + E_c \cos\phi_c (1/2\theta - 1/4 \sin 2\theta) \right.$$
$$\left. -\frac{E_c}{4} \sin\phi_c \cos 2\theta + \frac{E_w}{2}\left(\sin\theta - \frac{\sin 3\theta}{3}\right)\right]_0^{2\pi}$$
$$= \pi E_c \cos\phi_c \qquad (12)$$
Similarly, $$\epsilon_y = \int_0^{2\pi} E_{py} d\theta = \pi E_c \sin\phi_c \qquad (13)$$

Thus, in the integration, all terms vanish except the $\sin^2 \theta$ term in $E_{px}$ (Equation 10) and the $\cos^2 \theta$ term in $E_{py}$ (Equation 11). These terms yield $\epsilon_x$ and $\epsilon_y$ proportional to the components of centering error $E_c$ lying along each axis. The terms $\epsilon_x$ and $\epsilon_y$ are zero only when the centering error is zero: $E_c = 0$.

To obtain a measure of tracer adjustment error, $\epsilon_t$, the unresolved signal, $E_p$, of Equation 7a is integrated around the test specimen.

$$\epsilon_t = \int_0^{2\pi} E_p d\theta$$
$$= \int_0^{2\pi} [E_t + E_o \sin(\theta + \phi_c) + E_w \sin 2\theta] d\theta$$
$$= 2\pi E_t \qquad (14)$$

In this integration all periodic terms vanish, leaving $\epsilon_t$ proportion to $E_t$, which becomes zero only when $E_t = 0$, and the tracer is correctly positioned after one revolution to equalize in polarity the maximum fluctuations in the tracer output.

The result of the preceding steps is that integration of $E_{px}$, $E_{py}$ and $E_p$ once around the specimen yields nonzero results which are a measure of how much table 24 must be moved and how much tracer 40 must be adjusted.

Figure 5:
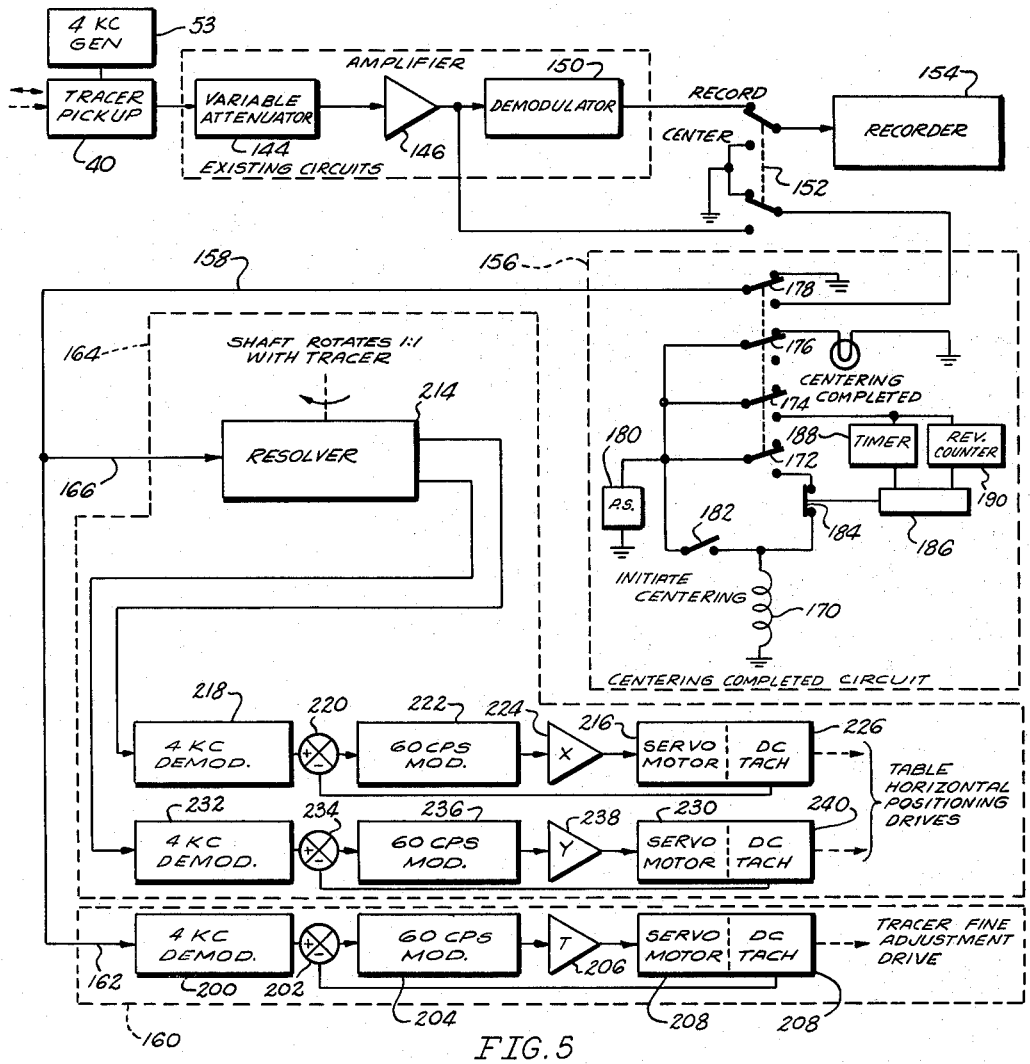
FIGURE 5 is a circuit diagram of a simplified complete servo control constructed in accordance with another aspect of the present invention to initiate centering of the specimen during an initial revolution of the tracer.

Based on a recognition that centering can be completed in one revolution of tracer 40 it has been found in accordance with another aspect of the present invention that adjustment of slides 16 and 18 and tracer 40 can be initiated during and before completing an initial revolution to save time in the centering process. FIG. 5 illustrates a servo control circuit for continuously adjusting slides 16 and 18 during an initial revolution to progressively reduce the centering error as well as the tracer adjustment error to zero at the completion of one revolution of tracer 40 about specimen 28. The output from tracer 40 (coil 52), FIGS. 1 and 5, is applied to a variable attenuator 144 whose output is in turn connected to an amplifier 146. A lead 148 is connected to the output of amplifier 146 to provide an input for the servo control during the centering operation. Also connected to the output of amplifier 146 is a demodulator 150. Attenuator 144, amplifier 146 and demodulator 150 are existing circuits in prior rotary profile recorders. A switch 152 selectively connects demodulator 150 to a recorder 154 or lead 148 to the servo control circuit.

The control circuit generally comprises a circuit 156 to initiate and terminate a centering operation. A lead 158 connects circuit 156 to a tracer servo 160 through a lead 162 and to a slide servo 164 through a lead 166. Circuit 156 comprises a relay 170 having four contacts 172, 174, 176, and 178. Relay 170 is connected to a power supply 180 through a manual switch 182. Contacts 172 seal relay 170 through normally closed contacts 184 of a marginal relay 186. Contacts 174 connect an adjustable timer 188 and a revolution counter 190 to power supply 180. Counter 190 is driven by spindle 32 to count the revolutions of tracer 40. Contacts 176 connect an indicator 192 to power supply 180. Contacts 178 connect the output of amplifier 146 to lead 158 through lead 148 and switch 152 when the switch 152 is in its center position.

Tracer servo 160 includes a demodulator 200 connected to an adder 202 which in turn is connected to a 60-cycle modulator 204. Modulator 204 is connected to a servo amplifier 206 which in turn is connected to a servo motor 208. Motor 208 replaces motor 54 (FIGS. 2A and 4) to adjust tracer 40. A direct current tachometer 210 is connected to motor 208 to provide feed back through adder 202 and linearize the response of motor 208.

Servo control 164 comprises a resolver 214 which is identical to resolver 108 in FIGS. 1 and 4. Resolver 214 develops a pair of quadrature control signals that are sine and cosine functions corresponding to X and Y axis components of the tracer output. The X-axis quadrature signal is connected to a servo motor 216 through a 4-kilocycle demodulator 218, an adder 220, a 60-cycle modulator 222 and a servo amplifier 224. A direct current tachometer 226 is connected between motor 216 and adder 220 to provide feedback for linearizing the response of motor 216. Motor 216 replaces motor 52a in FIGS. 3 and 4 to adjust table 24. Similarly the Y-axis quadrature control signal from resolver 214 is applied to a servo motor 230 through a 4-kilocycle demodulator 232, an adder 234, a 60-cycle modulator 236 and a servo amplifier 238. A direct current tachometer 240 is connected between motor 230 and adder 234 to provide feedback for linearizing the response of motor 230. Motor 230 replaces motor 50a in FIGS. 3 and 4 to adjust table 24.

Figure 6:
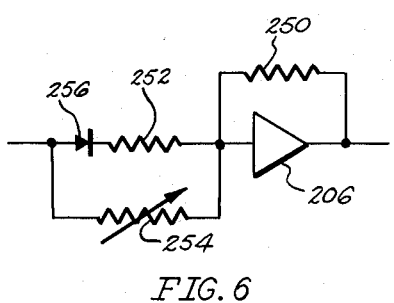
FIGURE 6 is a circuit diagram of a servo amplifier useful with the present invention to automatically vary closed loop gain in the servo control.

Amplifiers 206, 224 and 238 are variable gain amplifiers of the type illustrated in FIG. 6. For purposes of illustration amplifiers 206 has a feedback resistor 250 and a pair of input bias resistors 252 and 254. Resistor 252 is connected in series with a rectifier 256 across resistor 254. Resistor 254 is manually variable and is adjusted in accordance with the speed of spindle 32 during course and fine centering steps. For a given setting of resistor 254, rectifier 256 conducts on large signals to provide high gain and high bandpass in amplifier 206 and thus provide fast response of servo motors 208. For the same sensitivity setting of resistor 254, on small signals rectifier 256 is non-conducting so that the gain and bandpass of the amplifiers is determined by the ratio of resistor 250 to resistor 254. On small signals the bandpass of amplifiers 206, 224 and 238 is such as to reject the second harmonic of the tracer output for one revolution. By way of example for a spindle speed of 10 r.p.m., the bandpass of amplifier 206 is in the order 1/6 cycle per second. For a spindle speed of 1/10 r.p.m. the bandpass is in the order 1/600 cycle per second.

Operation of the control illustrated in FIG. 5 corresponds to the operation of the control disclosed hereinabove in connection with FIG. 4 except that servo motors 208, 216, and 230 perform the required integration to progressively reduce the centering error of table 24 and adjustment error of tracer 40 to zero. When switch 152 is moved to its lower position and switch 182 is closed motors 208, 216 and 230 will immediately begin to adjust tracer 40 and table 24.

The motion of each motor will consist of two components. For the tracer servo motor 208 a motion component due to position error of table 24 will be sinusoidal, while a component adjusting tracer 40 will be non-periodic and in the direction to reduce the error of tracer 40 to zero. Similarly, for slide servo 164 (motors 216 and 230) a motion component due to adjustment error of tracer 40 will be periodic, while a component adjusting table 24 will be non-periodic and in a direction to reduce the error of table 24 to zero. Thus each servo 160 and 164 will work to reduce its own error, while responding sinusoidally to the error for the other servo in a way which will eventually converge to zero for both tracer 40 and table 24. The servo action is repeated progressively through course and fine sensitivity ranges at decreasing speeds of spindle 32.

For each sensitivity range the duration of the centering operation is determined by timer 188 and counter 190. Relay 186 is actuated to terminate a centering operation only after timer 188 has timed out and counter 190 has counted a predetermined number of revolutions of tracer 40. Ideally, for each sensitivity range a centering operation can be completed within one revolution of tracer 40 since reduction of the centering error of table 24 and adjustment error of tracer 40 towards zero is initiated as soon as tracer 40 begins to rotate. However, for a practical commercial recorder, timer 188 and counter 190 are set to assure optimum centering at each sensitivity range.

By way of example on four coarse adjustments counter 190 may be at two revolutions and timer 188 at two minutes. For the last two or fine adjustments timer 188 may be set at four minutes and counter 190 at four revolutions. When timer 188 has timed out and the spindle has rotated the number of revolutions set on counter 190 relay 186 is actuated to open contacts 184 and de-energize relay 170 to terminate a centering operation and light indicator 192.

Automatic centering in accordance with the invention set forth hereinabove is faster and consistently more accurate than manual centering by the four point method previously used. Further reductions in the time to complete a centering operation are contemplated by terminating the centering operation for each sensitivity setting in accordance with the magnitude of the error signal, for example, the velocity of the motors 208, 216, and 230, rather than by timers and revolution counters. With the control illustrated in FIG. 5 completion of a centering operation in one revolution of tracer 40 is contemplated by using very accurate and sophisticated servos. Automatic centering in accordance with the present is particularly advantageous since the output of tracer 40 is used directly to position table 24 and tracer 40. Additionally table 24 and tracer 40 are adjusted simultaneously to reduce the centering error and tracer adjustment error rapidly toward zero.

It will be understood that the method and apparatus for automatic centering which are herein disclosed and described are presented for purposes of explanation and illustration and are not intended to indicate limits of the invention, the scope of which is defined by the following claims.

What is claimed is:

1. In profile recording apparatus which includes a table for supporting a workpiece having an axis, gaging means adapted to engage a surface of said workpiece, and means providing for relative rotation of said gaging means and said workpiece about an axis of rotation parallel to said workpiece axis, servo means for moving said table along mutually perpendicular axes perpendicular to the axis of said workpiece to adjust the location of said axis of said workpiece to align the axis of said workpiece with said axis of rotation comprising means responsive to movement of said gaging means toward and away from said axis of rotation along said surface of said workpiece during relative rotation of said gaging means and said workpiece about said axis of rotation for providing an electric signal representing a displacement of said workpiece axis from said axis of rotation, resolver means responsive to said relative rotation and said signal for developing components of said signal related to components of said displacement along said mutually perpendicular axes and means for applying said signal components to said servo means.

2. The apparatus set forth in claim 1 wherein said servo means further comprises means for integrating said signal components over a sector of said relative rotation, and means for applying said integrated signal components to said servo means to reduce said displacement of said workpiece axis from said rotation axis along said mutually perpendicular axes.

3. The apparatus set forth in claim 1 wherein said electrical signal also represents irregularities in said surface, said gaging means having a predetermined null position corresponding to minimum amplitude and equalized polarity variations of said electrical signal, and said apparatus further comprises additional servo means responsive to said electrical signal for adjusting said gaging means radially of said axis of rotation toward said predetermined null position.

4. In profile recording apparatus which includes a table for supporting a workpiece having an axis, rotatable gaging means adapted to engage a surface of said workpiece and having an axis of rotation parallel to said workpiece axis, and servo means for moving said table along mutually perpendicular axes perpendicular to the axis of said workpiece to adjust the location of said axis of said workpiece and to align the axis of said workpiece with said axis of rotation comprising means responsive to movement of said gaging means toward and away from said axis of rotation along said surface of said workpiece for providing an electrical signal representing a displacement of said workpiece axis from said axis of rotation, resolver means responsive to said signal and rotation of said gaging means for developing components of said signal related to components of said displacement along said mutually perpendicular axes, and means for applying said signal components to said servo means to cause said servo means to move said table in a direction that reduces said displacement toward zero.

5. The combination for recording the profile of an object comprising a horizontal table member for supporting said object, a tracer member having a movable stylus for engaging a surface of said object in a horizontal plane above said table member when said object is supported on said table, said object having an area center in said plane, means mounting one of said members for universal movement in a horizontal plane along a longitudinal axis and along a transverse axis perpendicular to said longitudinal axis, means for rotating one of said members about a vertical axis, means responsive to movement of said stylus by said object for developing an electrical output signal representing irregularities in said surface and a displacement of said area center relative to said rotational axis, said stylus having a predetermined null position corresponding to minimum amplitude and equalized polarity variations of said output signal, and first, second and third closed loop servos, said first servo being operatively connected to said signal and said universally movable member to minimize said displacement along one of said perpendicular axes, said second servo being operatively connected to said signal and said universally movable member to minimize said displacement along the other of said perpendicular axes, said third servo being operatively connected to said signal and said tracer to locate said tracer with said stylus at said null position.

6. In profile recording apparatus which includes a table for supporting a workpiece having an axis, rotatable gaging means adapted to engage a surface of said workpiece and having an axis of rotation parallel to said workpiece axis, and servo means for moving said table along mutually perpendicular axes perpendicular to the axis workpiece to adjust the location of said axis of said workpiece and to align the axis of said workpiece with said axis of rotation comprising means responsive to movement of said gaging means toward and away from said axis of rotation along said surface of said workpiece for providing an electrical signal representing a displacement of said workpiece axis from said axis of rotation, resolver means responsive to said signal and rotation of said gaging means for developing components of said signal related to components of said displacement along said mutually perpendicular axes, means for integrating said signal components over a sector of rotation of said gaging means, and means for applying said integrated signal components to said servo means to reduce said displacement of said workpiece axis from said rotation axis along said mutually perpendicular axes.

7. The method of centering an object having an axis on a profile recorder having a table for supporting said object and gaging means adapted to engage a surface of said workpiece, the steps comprising:

(a) relatively rotating said gaging means and said workpiece about an axis of rotation parallel to said workpiece axis;

(b) providing an electric signal in response to movement of said gaging means toward and away from said axis of rotation during said relative rotation which is representative of the displacement of said axes;

(c) resolving said signal into components related to components of said displacement along mutually perpendicular axes perpendicular to said axis of rotation; and (d) moving said table along said mutually perpendicular axes in accordance with said signal components for distances sufficient to align said workpiece axis and said axis of rotation.

8. The combination for recording the profile of an object comprising a horizontal table member for supporting said object, a tracer member having a movable stylus for engaging a surface of said object in a horizontal plane above said table member when said object is supported on said table, said object having an area center in said plane, means mounting one of said members for universal movement in a horizontal plane along a longitudinal axis and along a transverse axis perpendicular to said longitudinal axis, means for rotating one of said members about a vertical axis, first means for moving said universal mounting means in opposite directions along said longitudinal axis, second means for moving said universal mounting means in opposite directions along said transverse axis, third means for moving said tracer member radially of said rotational axis, means responsive to movement of said stylus by said object for developing an electrical output signal representing irregularities in said surface and a displacement of said area center from said rotational axis, said stylus having a predetermined null position corresponding to minimum amplitude and equalized polarity variations of said output signal, and control means responsive to said output signal for substantially simultaneously operating said first, second and third moving means to align said area center with rotational axis and dispose said stylus in said null position, said control means comprising means responsive to said output signal for developing a pair of quadrature control signals related to components of said displacement along said longitudinal and said transverse axes respectively, a first motor connected to said first moving means operable in response to one of said quadrature signals, a second motor connected to said second moving means operable in response to the other of said quadrature signals, and a third motor connected to said third moving means and operable in response to said output signal.

9. The combination set forth in claim 8 wherein said control means comprises means for separately integrating each of said quadrature signals over a sector of rotation of said rotating member and for applying said integrated signals to said first and second motors.

10. The combination set forth in claim 8 wherein said control means comprises means for integrating said quadrature control signals over one complete revolution of said rotating member and for applying said integrated signals to said motors.

11. The combination set forth in claim 8 wherein said motors are servo motors and said servo motors integrate said quadrature signals continuously during an initial revolution of said rotating member.

12. The combination set forth in claim 8 wherein said means for developing said quadrature signals comprises a resolver and means for driving said resolver synchronously with said rotating member.

13. The combination set forth in claim 8 wherein said table is supported for universal movement in a horizontal plane and said tracer is mounted for rotation about a vertical axis.

14. The combination set forth in claim 8 wherein said control means further comprises means for initiating operation of said motors at the beginning of a centering operation, and means for automatically terminating operation of said motors at the completion of a centering operation.

15. The combination set forth in claim 8 wherein said control system further comprises three servo amplifiers each of which is connected to the input of a respective servo motor, each of said servo amplifiers having a variable gain and a variable bandpass, and means for varying the gain and the bandpass of said amplifiers in accordance with input level to said amplifiers.

16. In the method of centering an object on a profile recorder prior to recording the profile of said object, said profile recorder being of the type having a table member for supporting said object, a tracer member having a movable stylus for engaging a surface of said object in a horizontal plane above said table member when said object is supported on said table, said object having an area center in said plane, means mounting one of said members for universal movement in a horizontal plane along a longitudinal axis and along a transverse axis perpendicular to said longitudinal axis, means for rotating one of said members about a vertical axis, and means responsive to movement of said stylus by said object for developing an electrical output signal representing irregularities in said surface and a displacement of area center from said rotational axis, said stylus having a predetermined null position corresponding to minimum amplitude and equalized polarity variations of said electrical signal, the steps of resolving a portion of said output signal into a pair of quadrature control signals related to components of said displacement along said longitudinal and said transverse axes respectively moving said universally movable member along said longitudinal axis in accordance with one of said quadrature signals, moving said universally movable member along said transverse axis in accordance with the other of said quadrature control signals, and moving said tracer member radially of said rotational axis toward said null position in accordance with an unresolved portion of output signal.

17. The method set forth in claim 16 wherein said universally movable member and said tracer member are moved substantially simultaneously.

18. The method set forth in claim 16 wherein each of said quadrature control signals and said unresolved portion of output signal are integrated and universally movable member and said tracer member are moved in accordance with said integrated signals.

19. The method set forth in claim 16 wherein each of said quadrature control signals and said unresolved portion of output signal are integrated for one revolution of said rotating member and then said universally movable member and said tracer member are moved in accordance with said integrated signals.

20. The method set forth in claim 16 wherein said signals are integrated continuously during and prior to completion of an initial revolution of said rotating member and said universally movable member and said tracer member are moved in accordance with said integrated signals during said initial revolution.

References Cited by the Examiner

UNITED STATES PATENTS

| 1,488,564 | 4/1924 | Steinle | 33—174 |
| 2,629,936 | 3/1953 | Cronstedt | 33—174 |
| 3,125,811 | 3/1964 | Pierce et al. | 33—174 |
| 3,160,958 | 12/1964 | Huntley | 33—174 |
| 3,164,909 | 1/1965 | Rosenberg | 33—174 |

LEONARD FORMAN, *Primary Examiner.*

SAMUEL S. MATTHEWS, *Examiner.*